(12) United States Patent
Nikishov et al.

(10) Patent No.: US 12,155,126 B2
(45) Date of Patent: Nov. 26, 2024

(54) MIMO ANTENNA ARRAY WITH WIDE FIELD OF VIEW

(71) Applicant: Samsung Electronics Co., Ltd., Suwon-si (KR)

(72) Inventors: Artem Yurievich Nikishov, Moscow (RU); Byung Kwan Kim, Suwon-si (KR); Gennadiy Aleksandrovich Evtyushkin, Moscow (RU); Jong-Sok Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/981,618

(22) Filed: Nov. 7, 2022

(65) Prior Publication Data

US 2023/0055599 A1 Feb. 23, 2023

Related U.S. Application Data

(63) Continuation of application No. 16/682,223, filed on Nov. 13, 2019, now Pat. No. 11,509,073.

(30) Foreign Application Priority Data

Nov. 13, 2018 (RU) .................................. 2018139881
Aug. 26, 2019 (KR) .......................... 10-2019-0104540

(51) Int. Cl.
*H01Q 25/00* (2006.01)
*G01S 7/03* (2006.01)
(Continued)

(52) U.S. Cl.
CPC ............... *H01Q 25/00* (2013.01); *G01S 7/03* (2013.01); *G01S 13/931* (2013.01);
(Continued)

(58) Field of Classification Search
CPC .... H01Q 25/00; H01Q 1/3233; H01Q 1/3283; H01Q 21/08; H01Q 3/00; H01Q 1/3208;
(Continued)

(56) References Cited

U.S. PATENT DOCUMENTS

| 4,115,782 A | 9/1978 | Han et al. |
| 5,319,377 A | 6/1994 | Thomas et al. |

(Continued)

FOREIGN PATENT DOCUMENTS

| CN | 102623805 A | * | 8/2012 | ............. H01Q 21/00 |
| KR | 10-2013-0085303 A | | 7/2013 | |

(Continued)

OTHER PUBLICATIONS

CN_102623805_A_I_translate.pdf—CN-102623805-A translate (Year: 2012).*

(Continued)

*Primary Examiner* — Olumide Ajibade Akonai
*Assistant Examiner* — Yonghong Li
(74) *Attorney, Agent, or Firm* — NSIP Law

(57) ABSTRACT

An antenna array apparatus includes: first antenna elements arranged to form a first radiation pattern with a recessed portion at the center of the first radiation pattern; and second antenna elements arranged to form a second radiation pattern with a convex portion at the center of the second radiation pattern.

17 Claims, 20 Drawing Sheets

(51) Int. Cl.
  *G01S 13/931* (2020.01)
  *H01Q 1/32* (2006.01)
  *H01Q 21/08* (2006.01)

(52) U.S. Cl.
  CPC ......... *H01Q 1/3233* (2013.01); *H01Q 1/3283* (2013.01); *H01Q 21/08* (2013.01); *G01S 2013/93275* (2020.01)

(58) Field of Classification Search
  CPC ........ H01Q 1/325; H01Q 21/06; H01Q 21/00; G01S 7/03; G01S 13/931; G01S 2013/93275
  See application file for complete search history.

(56) References Cited

U.S. PATENT DOCUMENTS

| | | | |
|---|---|---|---|
| 5,966,102 | A | 10/1999 | Runyon |
| 5,977,925 | A | 11/1999 | Hamnen et al. |
| 6,067,053 | A | 5/2000 | Runyon et al. |
| 6,922,177 | B2 | 7/2005 | Barnes et al. |
| 7,728,769 | B2 | 6/2010 | Chang et al. |
| 9,116,227 | B2 | 8/2015 | Lee et al. |
| 9,203,586 | B2 | 12/2015 | You et al. |
| 9,229,100 | B2 | 1/2016 | Lee et al. |
| 9,917,355 | B1 | 3/2018 | Lee et al. |
| 10,148,012 | B2* | 12/2018 | Wu ................. H01Q 1/246 |
| 10,866,305 | B1 | 12/2020 | Campbell et al. |
| 2006/0262007 | A1 | 11/2006 | Bonthron et al. |
| 2008/0303711 | A1* | 12/2008 | Matsuoka .......... G01S 13/345 342/196 |
| 2008/0316097 | A1 | 12/2008 | Mckinley et al. |
| 2012/0274499 | A1 | 11/2012 | Chang |
| 2013/0057432 | A1* | 3/2013 | Rajagopal .......... H01Q 25/002 342/368 |
| 2016/0077195 | A1 | 3/2016 | Chang |
| 2016/0116582 | A1 | 4/2016 | Chang |
| 2017/0328994 | A1 | 11/2017 | Abe |
| 2017/0331178 | A1 | 11/2017 | Tsai |
| 2017/0358866 | A1* | 12/2017 | Xian ................. H01Q 21/22 |
| 2018/0031695 | A1 | 2/2018 | Carswell et al. |
| 2018/0128917 | A1 | 5/2018 | Bialer |
| 2018/0136312 | A1 | 5/2018 | Fetterman |

FOREIGN PATENT DOCUMENTS

| | | |
|---|---|---|
| KR | 10-2013-0102169 A | 9/2013 |
| KR | 10-2016-0081756 A | 7/2016 |
| WO | WO 99/66637 A1 | 12/1999 |
| WO | WO 2007/014333 A2 | 2/2007 |

OTHER PUBLICATIONS

E. Holzman, "On the use of dummy elements to match edge elements in transmit arrays," 2013 IEEE International Symposium on Phased Array Systems and Technology, Waltham, MA, USA, 2013, pp. 549-552, doi: 10.1109/ARRAY.2013.6731887. (Year: 2013).*

Khan, H et al., "Ultra Wideband Multiple-Input Multiple-Output Radar", *IEEE International Radar Conference*, 2005, pp. 1-5 (5 pages in English).

Zhao, L et al., "A Decoupling Technique for Four-Element Symmetric Arrays with Reactively Loaded Dummy Element", *IEEE Transactions on Antennas and Propagation*, vol. 62, No. 8, Aug. 2014, 4416-4421 (6 pages in English).

Wang, R et al. "Planar Phased Array with Wide-Angle Scanning Performance Based on Image Theory", *IEEE Transactions on Antennas and Propagation*, vol. 63, No. 9, Sep. 2015, 3908-3917 (10 pages in English).

Cheng, Y et al., "Dual-Band Wide-Angle Scanning Phased Array Composed of SIW-Cavity Backed Elements", *IEEE Transactions on Antennas and Propagation*, vol. 66, No. 5, May 2018, 2678-2683 (6 pages in English).

Mofrad, Reza Fatemi, Ramazan Ali Sadeghzadeh, and Samaneh Alidoost. "Comparison of antenna beam broadening methods for phased array radar applications." *2011 Loughborough Antennas & Propagation Conference*. IEEE, 2011.

Korean Office Action issued on Oct. 24, 2023, in counterpart Korean Patent Application No. 10-2019-0104540 (1 page in English, 4 pages in Korean).

* cited by examiner

FIG. 6
■ : Active element
▨ : Neighboring active element
☐ : Dummy element
Case 1
Case 2
 or 
Case 3
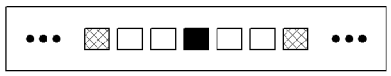
Case 4
 or 
Case 5
 or 

FIG. 9

| Case 1 | Case 2 | Case 3 | Case 4 | Case 5 |
|---|---|---|---|---|
| Deep recess at center | Flat area at center | Convex at center | Deep recess at center | Convex at center |
| Resulting radiation pattern | Resulting radiation pattern | Resulting radiation pattern | Resulting radiation pattern | Resulting radiation pattern |

Radiation patterns for modes

Radiation patterns for frequencies

MIMO ANTENNA ARRAY WITH WIDE FIELD OF VIEW

CROSS-REFERENCE TO RELATED APPLICATIONS

This application a continuation of U.S. patent application Ser. No. 16/682,223, filed on Nov. 13, 2019, which claims the benefit under 35 USC § 119(a) of Russian Patent Application No. 2018139881 filed on Nov. 13, 2018 in the Russian Federal Service for Intellectual Property, and Korean Patent Application No. 10-2019-0104540 filed on Aug. 26, 2019 in the Korean Intellectual Property Office, the disclosures of which are incorporated herein by reference in their entireties.

BACKGROUND

1. Field

The following description relates to a MIMO antenna array with a wide field of view (FoV).

2. Description of Related Art

A multiple-input and multiple-output (MIMO) radar system includes multiple receiving antennas and multiple transmitting antennas. In addition, each transmitting antenna of the system radiates a signal of a predetermined waveform independently of another transmitting antenna. Each receiving antenna receives these signals. A field of N transmitting antennas and a field of M receiving antennas mathematically result in a virtual field of NM antenna elements within the enlarged size of a virtual aperture of a MIMO array. The MIMO radar system may be used to improve the spatial resolution, and provide a substantially improved immunity to interference. By improving the signal-to-noise ratio, the target detection probability may be increased.

Radar systems may be applied in various industrial fields such as military equipment, communications, and vehicles. For example, a three-dimensional (3D) and/or four-dimensional (4D) radar system may be used in automotive navigation. A 3D radar system may include detecting a direction of an object in one of an azimuth (horizontal) plane and an elevation (vertical) plane, and determining a velocity of the object and a distance to the object. Meanwhile, a 4D radar system may track the direction of the object in both the azimuth plane and the elevation plane, and determine the velocity of the object and the distance to the object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an antenna array apparatus includes: first antenna elements arranged to form a first radiation pattern with a recessed portion at the center of the first radiation pattern; and second antenna elements arranged to form a second radiation pattern with a convex portion at the center of the second radiation pattern.

The first antenna elements and the second antenna elements may each include active elements and dummy elements.

The active elements and the dummy elements may have a same form factor.

$\lambda$ may be a length of an electromagnetic wave radiated by an active element of the active elements, and a distance between phase centers of directly adjacent elements, among elements including the active elements and the dummy elements, may be $\lambda/2$.

The first antenna elements may include first active elements and first dummy elements, and one or more of the first dummy elements may be disposed between the first active elements.

The second antenna elements may include second active elements and second dummy elements, and two or more of the second active elements may be disposed directly adjacent to each other in a row of the second antenna elements.

Active elements and dummy elements of the first antenna elements may be arranged in a row according to any one or any combination of any two or more of the following arrangements: a first arrangement wherein a dummy element is disposed directly between an active element and a next active element at one side of the active element, and one dummy element is disposed directly between the active element and a next active element at another side of the active element, a second arrangement wherein a dummy element is disposed directly between an active element and a next active element at one side of the active element, and two dummy elements are disposed directly between the active element and a next active element at another side of the active element, a third arrangement wherein two dummy elements are disposed directly between an active element and a next active element at one side of the active element, and two dummy elements are disposed directly between the active element and a next active element at another side of the active element, a fourth arrangement wherein a dummy element is disposed directly between an active element and a next active element at one side of the active element, and three or more dummy elements are disposed directly adjacent to the active element at another side of the active element, and a fifth arrangement wherein two dummy elements are disposed directly between an active element and a next active element at one side of the active element, and three or more dummy elements are disposed directly adjacent to the active element at another side of the active element.

The first arrangement may be configured to generate a deep recessed portion at the center of the first radiation pattern, the second arrangement may be configured to generate a recessed portion including a flat area at the center, the third and fifth arrangements may be configured to generate a recessed portion including a convex portion at the center, and the fourth arrangement may be configured to generate a shallow recessed portion at the center.

The first antenna elements may be arranged in the row according to any combination of any two or more of the first through fifth arrangements to generate the first radiation pattern.

The first radiation pattern and the second radiation pattern may combine to increase a field of view (FoV) of the antenna array.

Active elements of the second antenna elements may be configured to be receiving elements in response to the first antenna elements including transmitting elements as active elements, and active elements of the second antenna elements may be configured to be transmitting elements in response to the first antenna elements including receiving elements as the active elements.

The first antenna elements may include transmitting elements as active elements and the second antenna elements may include receiving elements as the active elements.

The first antenna elements may include receiving elements as the active elements and the second antenna elements may include transmitting elements as the active elements.

The apparatus may be a vehicle including an antenna array mounted on a bumper of the vehicle, and the antenna array may include the first antenna elements and the second antenna elements.

In another general aspect, an antenna array apparatus includes: an active element configured to radiate an electromagnetic wave; and one or more dummy elements having a same form factor as the active element, the one or more dummy elements being disposed on either one or both sides of the active element.

$\lambda$ may be a length of the electromagnetic wave, and a distance between phase centers of directly adjacent elements, among elements including the active element and the one or more dummy elements, may be $\lambda/2$.

The one or more dummy elements may include one or more antiphase dummy elements and one or more in-phase dummy elements, wherein the one or more antiphase dummy elements are configured to suppress the electromagnetic wave by reradiating a portion of energy of the electromagnetic wave, and the one or more in-phase dummy elements may be configured to amplify the electromagnetic wave by reradiating another portion of the energy of the electromagnetic wave.

The one or more dummy elements may include a plurality of dummy elements, a first dummy element closest to the active element, among the dummy elements, corresponds to the antiphase dummy element, and a second dummy element next closest to the active element after the first dummy element, among the dummy elements, may correspond to the in-phase dummy element.

A maximum radiation pattern of the active element may be suppressed by the one or more dummy elements, and a field of view (FoV) of the antenna array may be increased by the one or more dummy elements.

The active element may correspond to either one or both of a transmitting element and a receiving element.

Other features and aspects will be apparent from the following detailed description, the drawings, and the claims.

BRIEF DESCRIPTION OF THE DRAWINGS

FIG. 6 illustrates examples of arrangements of elements in a group #1 among elements of a MIMO array.

FIG. 9 illustrates examples of radiation patterns with respect to elements of a group #1.

Figure 1:
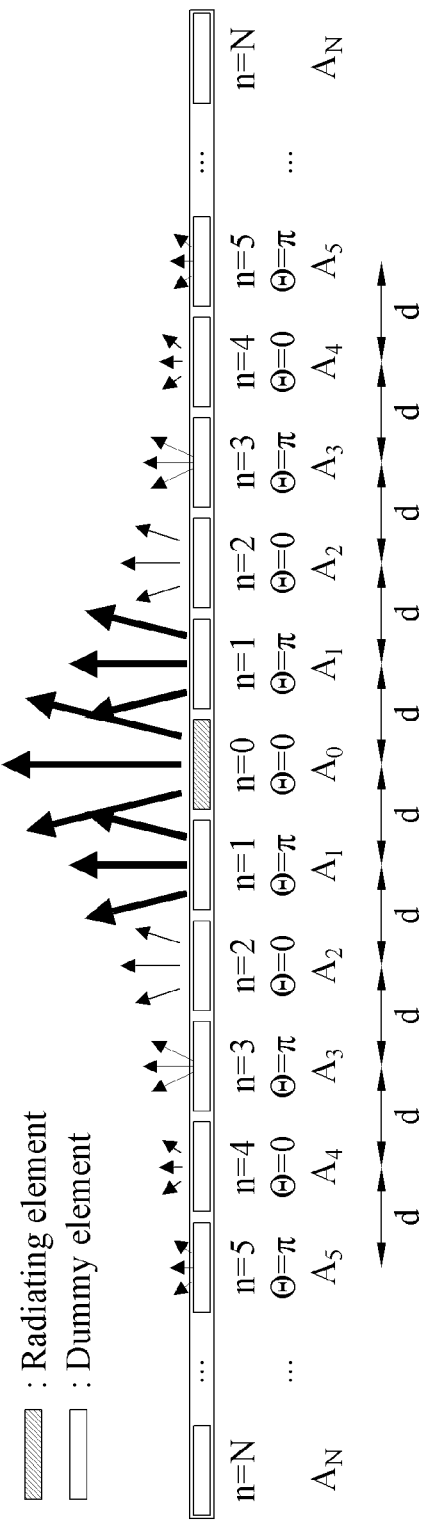
FIG. 1 illustrates an example of an operation principle of a portion of an antenna array including a radiating antenna element and several dummy elements.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains and after an understanding of the disclosure of this application. It will be further understood that terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Hereinafter, examples will be described in detail with reference to the accompanying drawings. In the drawings, like reference numerals are used for like elements.

FIG. 1 illustrates an example of an operation principle of a portion of an antenna array including a radiating antenna element and several dummy elements.

An antenna array may be applicable to various applications such as a communication antenna and an automotive radar. For example, a automotive radar system may operate in various modes such as short-range radar (SRR) corresponding to a short-range application with coverage of 30 meter (m) to 50 m, middle-range radar (MRR) corresponding to a middle-range application with coverage of 70 m to 100 m, and long-range radar (LRR) corresponding to a long-range application with coverage of 150 m to 200 m. To increase the resolution of SRR and MRR, a radar system may detect a direction toward a target by applying a multiple-input and multiple-output (MIMO) scheme to digital beamforming.

For an application of the automotive radar system (in particular, the SRR mode), a wide field of view (FoV) of the radar system may be provided to an azimuth plane. For example, to detect an object in front (or in rear) of a vehicle, two antenna arrays may be mounted on a bumper of the vehicle. The arrays may each have an FoV of 90 degrees and thereby provide a total FoV of about 180 degrees. Parasitic lobes may appear in a radiation pattern of an antenna array having an FoV of 90 degrees or a wider FoV, and may reduce the energy efficiency of the antenna array.

An FoV of a MIMO radar having N transmitters (or receivers) and M receivers (or transmitters) may be determined based on angular directions in which a gain of a scanning beam envelope of a MIMO array is reduced by 3 dB, when compared to a maximum value. The gain of the scanning beam envelope of the MIMO array may be determined by Equation 1, for example.

$$DR(\theta) = \sum_{n=1}^{N} T_n(\theta) * \sum_{m=1}^{M} R_m(\theta) \qquad \text{Equation 1}$$

In Equation 1, $T_n(\theta)$ and $R_m(\theta)$ denote radiation patterns of all the N transmitters and the M receivers, and $\theta$ denotes an angle of the object on the azimuth plane. A side lobe is a lobe (local maximum value) of a far field pattern, other than a main lobe. A grating lobe is a side lobe of which an amplitude substantially increases and is proximate to a level of the main lobe of a phased array antenna due to a spatial aliasing effect.

An FoV of a radiating antenna element (hereinafter, referred to as the "radiating element" and also as the "primary radiator") may increase by adding several rows of dummy antenna elements (hereinafter, referred to as the "dummy elements"). A distance (d) between phase centers of elements may be approximately $\lambda/2$ (i.e., $d \sim \lambda/2$). Here, $\lambda$ is the length of an electromagnetic wave of the band of the radiating element. $\lambda$ may be expressed by $\sqrt{\lambda_{max} \lambda_{min}}$. Here, $\lambda_{max}$ corresponds to a minimum frequency in band, and $\lambda_{min}$ corresponds to a maximum frequency in band.

The dummy elements may be identical to the radiating element. For example, the dummy elements may have a form factor the same as a form factor of an active element (for example, the radiating element). When dummy elements identical to radiating elements are used, a process of manufacturing the elements and an antenna array including the said elements may be integrated and advantageously simplified. Alternatively, some or all of the dummy elements may have a form factor different from the form factor of the active element.

At least one dummy element may be disposed on one side or both sides of the active element. When the dummy elements reflect a portion of the electromagnetic energy radiated by the radiating element, the FoV may increase. When the distance between phase centers of elements is $d \sim \lambda/2$, a phase difference between a given dummy element and the radiating element may be $n\pi$. Here, $n = 1, 2, 3, \ldots, N$, and n denotes a row index of a dummy element. Thus, a dummy element with an odd index may act as an antiphase element of the radiating element, and a dummy element with an even index may act as an in-phase element of the radiating element. The former will be referred to as an antiphase dummy element, and the latter will be referred to as an in-phase dummy element.

The antiphase dummy element may suppress the electromagnetic wave by reradiating a portion of the energy of the electromagnetic wave radiated by the active element, and the in-phase dummy element may amplify the electromagnetic wave by reradiating another portion of the energy of the electromagnetic wave radiated by the active element. When a dummy element in an n-th row reradiates $P_n$ being a portion of the electromagnetic energy of the radiating element, an amplitude of a waveform of the n-th row of the dummy element may be calculated as $A_n = P_n * A_0$, wherein $A_0$ denotes the amplitude of a signal of the radiating element.

In this example, an interaction between the dummy elements and the radiating (transmitting) antenna element has been considered. However, the dummy elements may also function in the same manner as in receiving antenna elements. The radiating antenna element and the receiving antenna elements may be collectively referred to as active elements.

A resulting configuration (radiating element+dummy element) may operate as an array including 2N+1 elements, as expressed by Equation 2, for example.

$$Evlaa_{n=N} = A_0\left(1 + \sum_{n=1}^{N} P_n\left(e^{-indk_0 sin\varphi + in\pi} + e^{indk_0 sin\varphi - in\pi}\right)\right)$$

$$= A_0\left(1 + \sum_{n=1}^{N} P_n(-1)^n\left(e^{-indk_0 sin\varphi} + e^{indk_0 sin\varphi}\right)\right)$$

Equation 2

In Equation 2, Evlaa denotes the total field of a virtual linear antenna array, $A_0$ denotes the amplitude of the signal of the radiating element, and N denotes the number of dummy elements on one side of the radiating element. vlaa denotes the virtual linear antenna array. The total number of dummy elements on both sides is 2*N. n denotes an index of a dummy element, wherein the index specifies a position (row) of the dummy element. For example, for a dummy element closest to the active element, n=1. $P_n$ denotes a portion of the electromagnetic energy of the radiating element reradiated by an n-th dummy element, d denotes a distance between phase centers of elements, $k_0$ denotes a wave number, and φ denotes an angular coordinate of a radiation pattern of an element.

When the number of dummy elements increases, the FoV of the radiation pattern of the radiating element may increase based on the angular coordinate of the radiation pattern, and a fluctuation of a gain level of a resulting radiation may decrease.

Figure 2A:
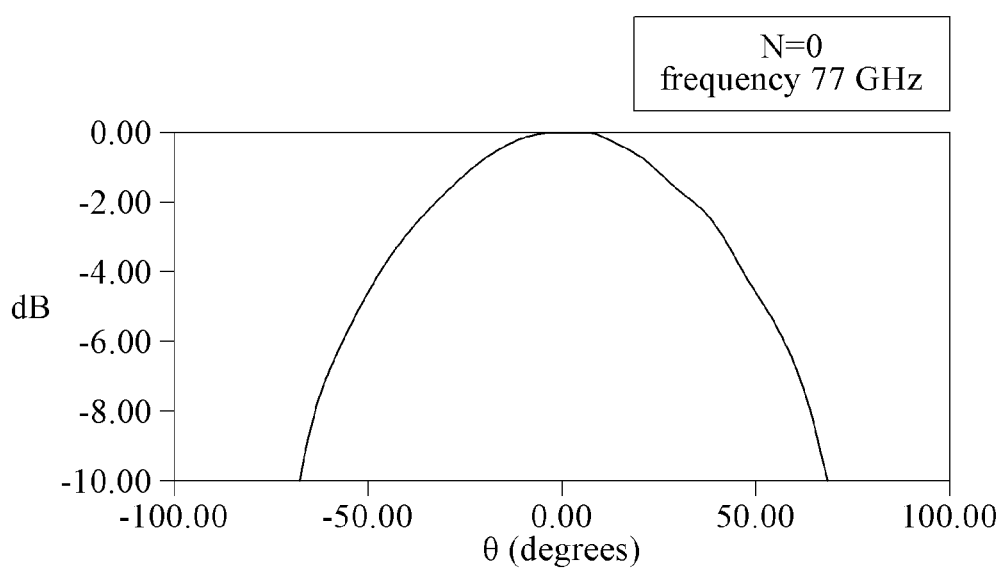
FIGS. 2A through 2C illustrate examples of effects of adding dummy elements to a radiating element.
Figure 2B:
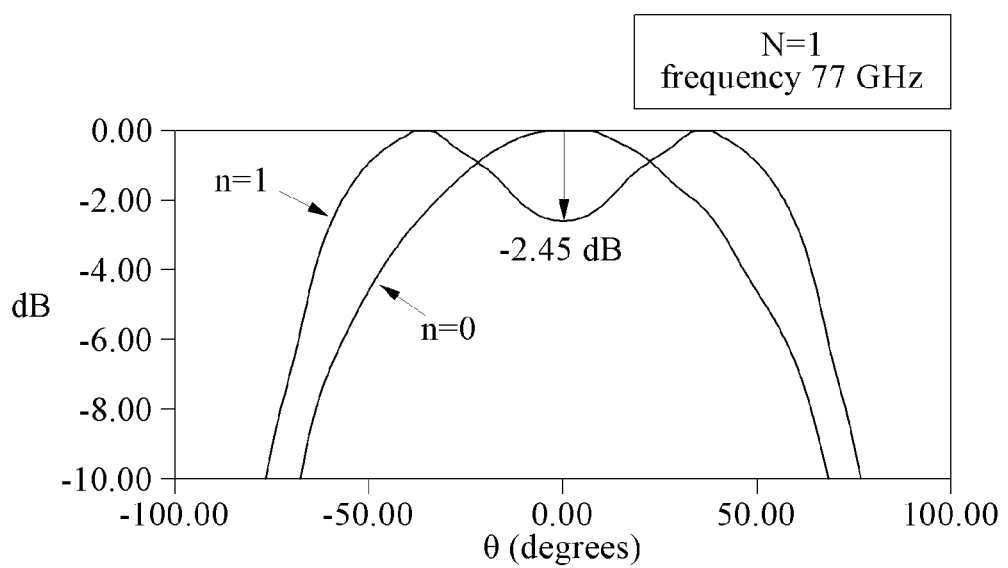
Figure 2C:
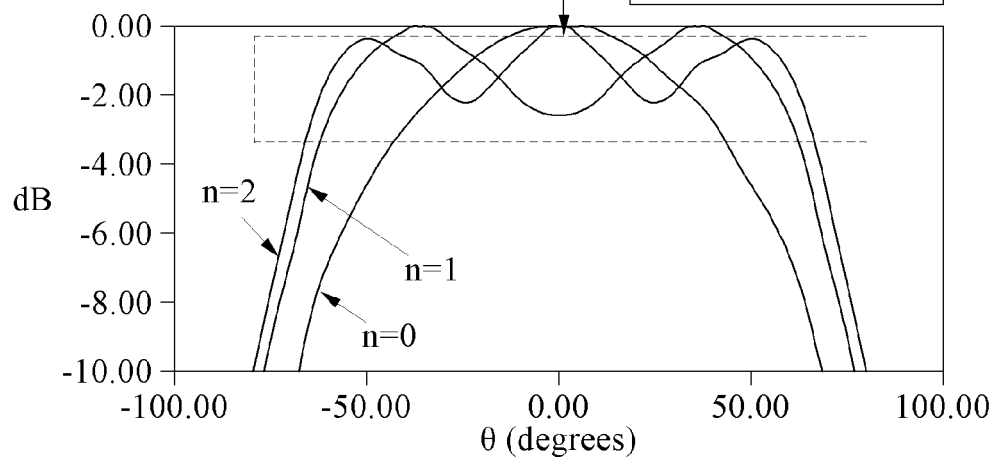
Figure 3A:
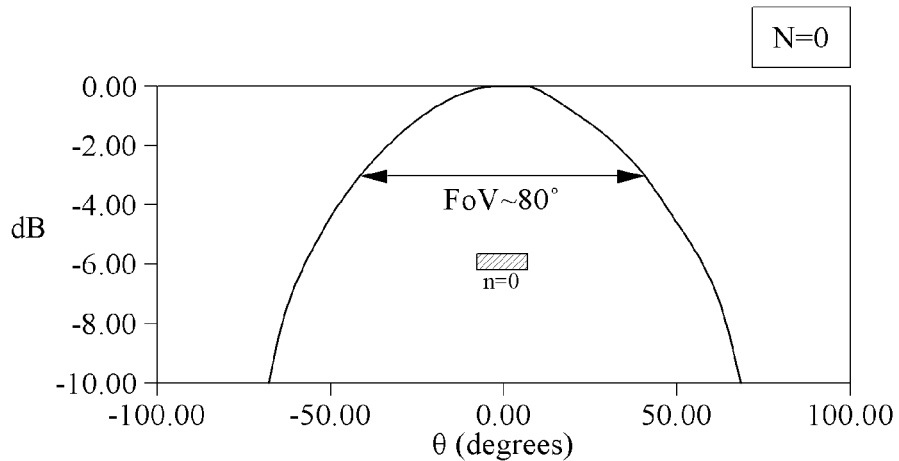
FIGS. 3A through 3F illustrate examples of simulation results of radiation patterns of a radiating element and dummy elements.
Figure 3B:
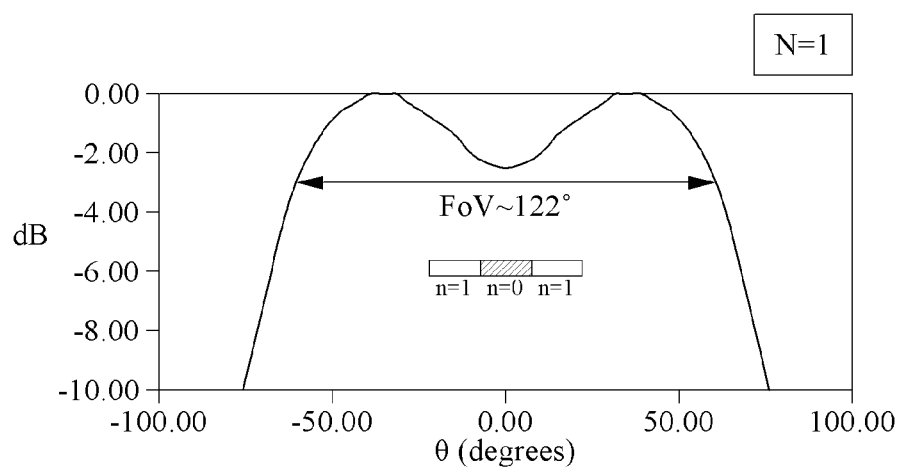
Figure 3C:
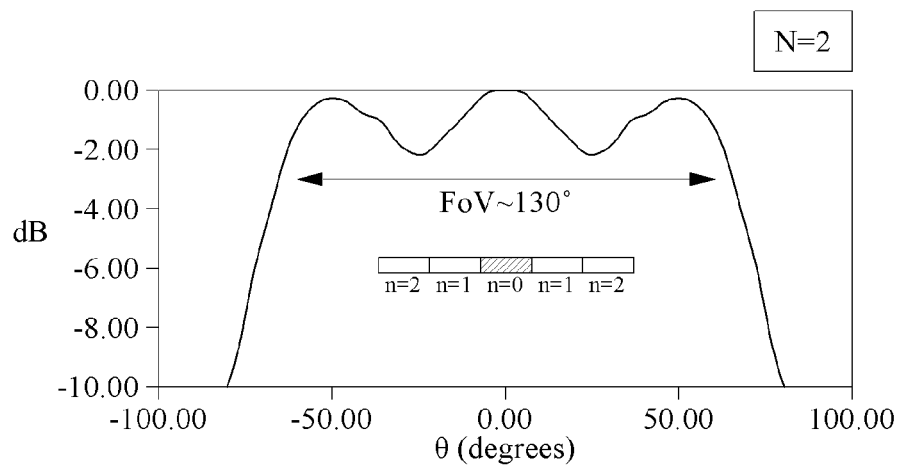
Figure 3D:
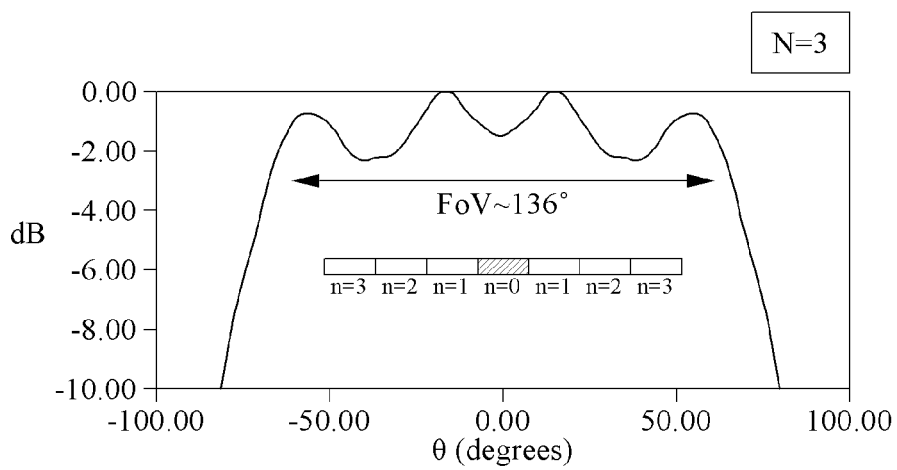
Figure 3E:
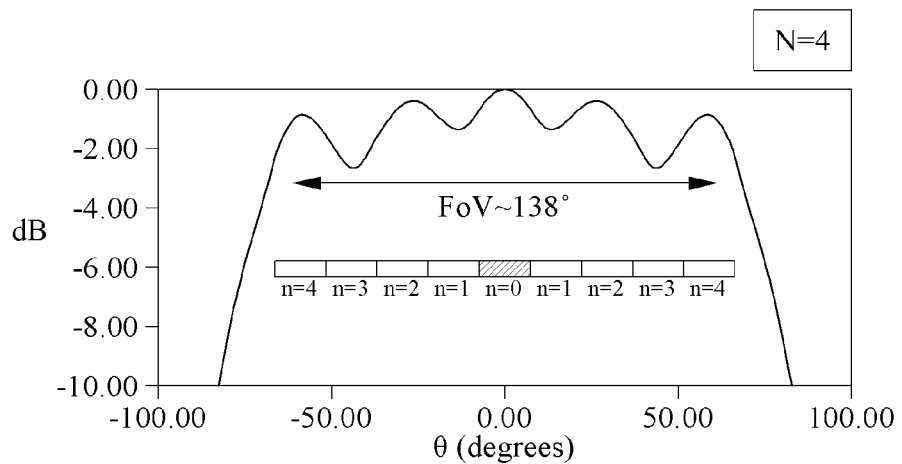
Figure 3F:
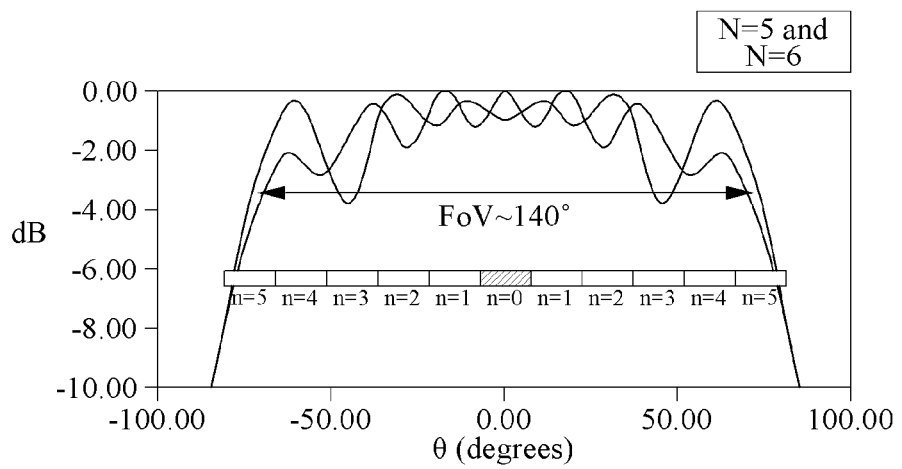

FIGS. 2A through 2C illustrate examples of effects of adding dummy elements to a radiating element.

FIG. 2A shows a radiation pattern of a single radiating element. Since there is no dummy element (N=0), the radiating element has a standard radiation pattern with respect to a single antenna element, and has an FoV (e.g., at −3 dB) of about 80 degrees.

FIG. 2B shows a radiation pattern in case of N=1. Here, one dummy element (an odd element) is disposed on each side of the radiating element, such that the two dummy elements are disposed symmetrically on both sides of the radiating element, which may be expressed by Equation 3, for example.

$$Evlaa_{n=1} = A_0(1 - P_1(e^{-idk_0 sin\,\varphi} + e^{idk_0 sin\,\varphi})) \quad (3)$$

The two dummy elements act as antiphase elements of the radiating element, and suppress the maximum radiation pattern of the radiating element. For example, if P1=−15 dB, a resulting radiation at 0 degrees decreases by −2.45 dB, when compared to a case of N=0. However, in this example, the FoV of the radiation pattern of −3 dB level increases, such that the FoV is about 120 degrees.

FIG. 2C shows a radiation pattern wherein N=2. Here, two dummy elements (an odd element and an even element) are disposed on each side of the radiating element, such that the four dummy elements are disposed symmetrically on both sides of the radiating element, which may be expressed by Equation 4, for example.

$$Evlaa_{n=2} = A_0(1 - P_1(e^{-idk_0 sin\,\varphi} + e^{idk_0 sin\,\varphi}) + P_2(e^{-i2dk_0 sin\,\varphi} + e^{i2dk_0 sin\,\varphi})) \quad (4)$$

The two odd dummy elements act as antiphase elements having a radiation amplitude $P_1$, whereas the two even dummy elements act as in-phase elements having a radiation amplitude P2. The in-phase dummy elements compensate for effects of the antiphase dummy elements. Thus, the minimum value of radiation increases, and the maximum value of radiation is suppressed. As a result, the FoV is about 130 degrees.

FIGS. 3A through 3F illustrate examples of simulation results of radiation patterns of a radiating element and dummy elements. Referring to FIGS. 3A through 3F, as the number of dummy elements increases, an oscillation frequency of a radiation pattern increases, and an amplitude of oscillation decreases. When the number of dummy elements reaches a predetermined number, the FoV barely increases.

FIGS. 3A through 3F show simulation results of radiation patterns in case of n=0 through n=6. At −3 dB, the FoV of radiation of the radiating element is about 80 degrees when n=0. When n=1, the FoV increases to about 122 degrees. When n=2, the FoV increases to about 130 degrees. When n=3, the FoV increases to about 136 degrees. When n=4, the FoV increases to about 138 degrees. When n=5 and when n=6, the FoV is about 140 degrees, exhibiting substantially no difference in FoV between n=5 and n=6.

By combining respective radiation patterns of the individual elements of the antenna array, a resulting radiation pattern is obtained. Radiation patterns of a radiating element and dummy elements may be calculated using Equation 5, for example.

$$Evlaa_{n=N} = A_0\left(1 + \sum_{n=1}^{N^+} P_n^+(x_n^+, d_n^+, w, z_n^+)(-1)^{n+} e^{-id_n^+ k_0 sin\varphi} + \sum_{n=1}^{N^-} P_n^-(x_n^-, d_n^-, w, z_n^-)(-1)^{n-} e^{-id_n^+ k_0 sin\varphi}\right)$$

Equation 5

In Equation 5, superscript "+" denotes a dummy element on the left side of the radiating element, and superscript "−" denotes a dummy element on the right side of the radiating element. $P_n(x_n, d_n, w, z_n)$ is a coefficient which defines a portion of power radiated by the radiating antenna element and radiated by an n-th dummy element. $x_n$ denotes a characteristic dimension of the dummy element in an azimuth direction, $d_n$ denotes a distance between a phase center of the radiating element and the n-th dummy element, w denotes a signal frequency, and $z_n$ denotes a surge resistance at the frequency w. In case of a dummy element, $z_n=\infty$. In case of a neighboring radiating element, $z_n$ may be ~50 Ohm, and may absorb up to 90% of energy.

When the active elements and the dummy elements are collectively referred to as elements, a distance between phase centers of elements neighboring (i.e., directly adjacent) each other (simply referred to as "neighboring elements) among the elements may be λ/2. It should be noted that when the distance between the phase centers of the neighboring elements is not λ/2, a phase difference between the elements may not be π. A resulting radiation pattern may be adjusted by controlling $p_n^+$ and For example, to control $P_n^+$ and $P_n^-$, the size of the dummy elements, a distance between the dummy elements, or a signal frequency may be changed.

FIGS. 4A through 4F illustrate examples of various configurations of antenna elements in an antenna array. A configuration of antenna elements in an antenna array may vary significantly depending on an application scenario.

Figure 4A:
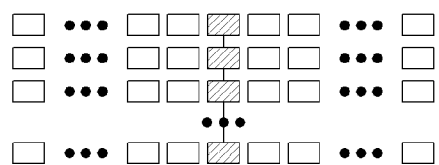
FIGS. 4A through 4F illustrate examples of various configurations of antenna elements in an antenna array.

FIG. 4A shows an arrangement of an antenna array including rows including a radiating element and dummy elements. In this example, the dummy elements (which may be identical to the radiating element) may be disposed symmetrically on both sides from each radiating element. The antenna array may increase a gain and decrease an FoV in a direction perpendicular to an extension of the FoV. For example, when the arrangement is used to extend the FoV in a horizontal direction, the FoV may narrow in a vertical direction. The arrangement is used for an automotive radar system for navigation.

Figure 4B:

FIG. 4B shows an arrangement of an antenna array including a single radiating element and a plurality of dummy elements. In this example, the dummy elements may be disposed symmetrically on both sides from the radiating element, and the dummy elements may have different widths. The different widths of the dummy elements may equalize a resulting radiation pattern of this arrangement. Further, the arrangement may extend the FoV. In an example, this representative of an example arrangement is representative of an example a communication device (for example, a 5G base station) or a vehicle (for example, when mounted on an external bumper).

Figure 4C:
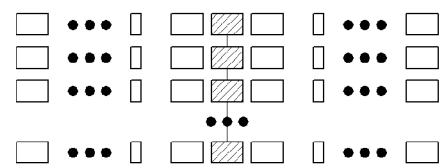

FIG. 4C shows a configuration of an antenna array including rows including a radiating element and dummy elements. Here, the dummy elements may be disposed symmetrically on both sides of each radiating element, and the dummy elements may have different widths. Similar to the arrangement of FIG. 4A, the antenna array may be used to increase a gain and decrease an FoV in a direction perpendicular to an extension of the FoV. Similar to the arrangement of FIG. 4B, the different widths of the dummy elements may equalize a resulting radiation pattern of this arrangement. The arrangement may also be used for a communication device or a vehicle.

Figure 4D:
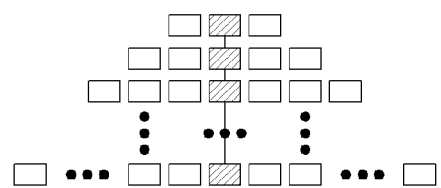

FIG. 4D shows an arrangement of an antenna array including rows including a radiating element and dummy elements. Here, the dummy elements may be disposed symmetrically on both sides from each radiating element, and the number of dummy elements with respect to each radiating element varies for each row. For example, each successive row may include two more dummy elements (one more on each side of the radiating element) than the previous row. The antenna array may be used to increase a gain and decrease an FoV in a direction perpendicular to an extension of the FoV. In this example, different numbers of dummy elements may provide different FoVs depending on a beam direction. This arrangement may be used for a 5G communication device or an automotive navigation system.

Figure 4E:

FIG. 4E shows an arrangement of an antenna array including a single radiating element and a plurality of dummy elements. Here, dummy elements may be disposed on only one side of the radiating element. While this arrangement is nor symmetric, this arrangement may reduce the size of the antenna array. This arrangement may be applied to, for example, a 5G communication device.

Figure 4F:
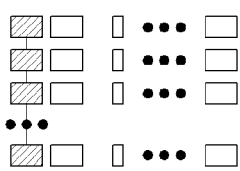

FIG. 4F shows an arrangement of an antenna array including rows of a radiating element and dummy elements. Here, the dummy elements may be disposed on only one side of each radiating element. In this example, the dummy elements may have different widths. Alternatively, the dummy elements may be disposed on two sides of each radiating element. However, even when the dummy elements are disposed on two sides of each radiating element, a dummy element of a given index on one side of the radiating element may be configured differently from a dummy element of the same index on the other side of the radiating element. This configuration may adjust a radiation pattern, and increase a gain and decrease an FoV in a direction perpendicular to an extension of the FoV. This arrangement may be applied to, for example, a 5G communication device.

In an example, a radiating element and dummy elements may be of a same type (for example, patch antennas. However, in an alternative example, the elements may be slot antennas or dipoles). In another example, dummy elements may be different from the radiating element. Further, other examples include other combinations of such elements. For example, the combinations may include a patch antenna as the radiating element and slot antennas as the dummy elements, a slot antenna as the radiating element and patch antennas as the dummy elements, and a dipole as the radiating element and slot antennas as the dummy elements.

In an alternative example, phases of signals reradiated by the dummy elements may be controlled by adding elements corresponding to a phase taper to the dummy element. For example, such elements may include a strip line and a microstrip line, and the length of the elements may define the phases of the reradiated signals.

Figure 5A:
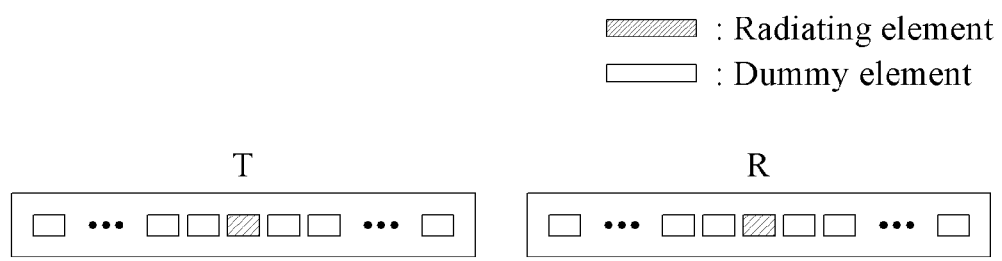
FIGS. 5A and 5B illustrate examples of a principle of forming a final radiation pattern of a multiple-input and multiple-output (MIMO) array.
Figure 5B:
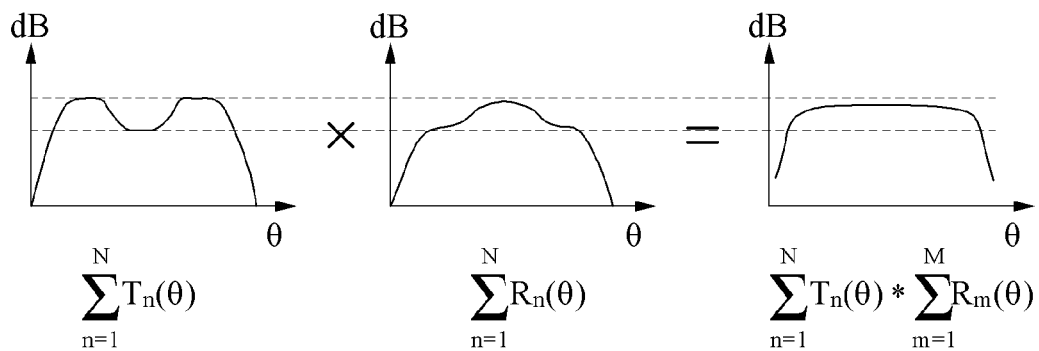

FIGS. 5A and 5B illustrate examples of a principle of forming a final radiation pattern of a MIMO array.

Referring to FIG. 5A, a MIMO array may include two element groups, a group #1 (indicated as T) and a group #2 (indicated as R) each including an active element and dummy elements. When a transmitting element (transmitter) is included as an active element in the group #1 T, a receiving element (receiver) is included as an active element in the group #2 R. Conversely, when a receiving element is included as the active element in the group #1 T, a transmitting element is included as the active element in the group #2 R.

Referring to FIG. 5B, a process of forming a final radiation pattern of a MIMO array is illustrated. A scanning beam envelope of the MIMO array may be determined based on Equation 1. According to Equation 1, a resulting radiation pattern and an FoV of the MIMO array may be determined to be a product of a sum of radiation patterns of the transmitting elements and a sum of radiation patterns of the receiving elements.

According to the configuration of the MIMO array, at least two antenna elements (for example, receiving antenna elements) are disposed neighboring on each other. To provide a function of the MIMO array in accordance with definition, two neighboring (for example, λ/2-spaced) active elements may be used. One of the neighboring active elements may absorbs a radiation of the other at a great angle, rather than reradiating the radiation of the other. For example, the neighboring active elements may form a radiation pattern with a convex portion at the center and reduce the FoV by reducing or attenuating a mutual gain at a great angle. This indicates that radiation patterns of the elements of the group #2 R may be formed to be convex at the center each time and reduce the FoV.

To form a wide FoV, two types of radiation patterns may be formed from the elements of the group #1 T and the group #2 R. Radiation patterns with a recess at the center may be formed by the antenna elements of the group #1 T, and radiation patterns with a convex portion at the center may be formed by the antenna elements of the group #2 R. Conversely, radiation patterns with a convex portion at the center may be formed by the antenna elements of the group #1 T, and radiation pattern with a recess at the center may be formed by the antenna elements of the group #2 R. As shown in FIGS. 5A and 5B, through geometrical averaging of the radiation patterns, the radiation patterns with a recess center portion and the radiation patterns with a convex center portion may be combined, whereby the FoV increases.

FIG. 6 illustrates examples of arrangements of active elements and dummy elements in a group #1, among elements of a MIMO array. The MIMO array may satisfy several conditions to form a wide radiation pattern.

The elements of the group #1 may include several active elements (transmitting or receiving), and several dummy elements with ~λ/2 distance between phase centers of every active element and the dummy elements. In this example, at least one dummy element may be provided between active elements. Antenna devices may be implemented by one of the following five cases (i.e., arrangements). The five cases are shown in FIG. 6.

1) Case 1 ("a" type elements): one dummy element may be disposed between an active element and a next (neighboring) active element from one side, and one dummy element may be disposed between the active element and a next active element from another side;

2) Case 2 ("b" type elements): one dummy element may be disposed between an active element and a next active element from one side, and two dummy elements may be disposed between the active element and a next active element from another side;

3) Case 3 ("c" type elements): two dummy elements may be disposed between an active element and a next active element from one side, and two dummy elements may be disposed between the active element and a next active element from another side;

4) Case 4 ("d" type elements): one dummy element may be disposed between an active element and a next active element from one side, and several dummy elements may be disposed from another side (edge case); and 5) Case 5 ("e" type elements): two dummy elements may be disposed between an active element and a next active element from one side, and several dummy elements may be disposed from another side (edge case).

The five cases of arrangements of the elements of the group #1 may have radiation patterns with a recess at the center.

The arrangement of antenna elements on a plane (in a horizontal row of the array) may determine whether a wide radiation pattern on the plane (in this example, a horizontal plane) is achieved. A relative arrangement of antenna elements in neighboring rows may have an effect principally on a radiation pattern of another direction. Such an effect may be ignored through the above cases. Thus, an arrangement of antenna elements in each horizontal row of the antenna array may be determined in view of only a required radiation pattern of the antenna array on the horizontal plane.

A single row of the group #1 may include any one or any combination of any two or more of Case 1 through Case 5. For example, to form a wide FoV of the elements of the group #1, a combination of the following cases may be used.

1) Y=2: d=2, a=b=c=e=0;
2) Y=3: b=d=e=1, a=c=0; and
3) Y≥1: b≥1, c≥0, a≥0, 2≥d≥0, 2≥e≥0.

Here, Y denotes the number of active elements in the group #1, and a, b, c, d, and e respectively denote the numbers of active elements for Case 1 through Case 5.

Figure 7:
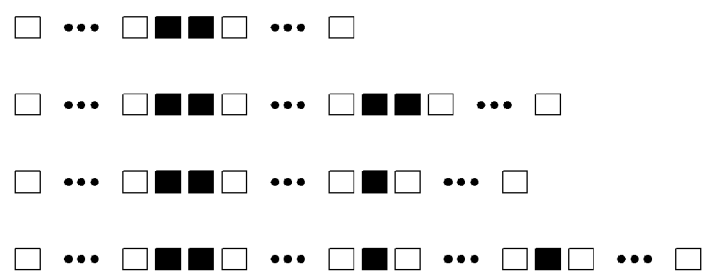
FIG. 7 illustrates examples of arrangements of elements in a group #2 among elements of a MIMO array.

FIG. 7 illustrates examples of arrangements of elements in a group #2 among elements of a MIMO array. The elements of the group #2 may include several active elements (receiving or transmitting), and several dummy elements with ~λ/2 distance between phase centers of every active antenna and the dummy elements. Further, at least two active elements may be spaced by ~λ/2 distance, with no dummy element therebetween. That is, at least two of the active elements are disposed directly adjacent to each other. This arrangement of the elements of the group #2 may result in radiation patterns with a convex portion at the center.

Figure 8:
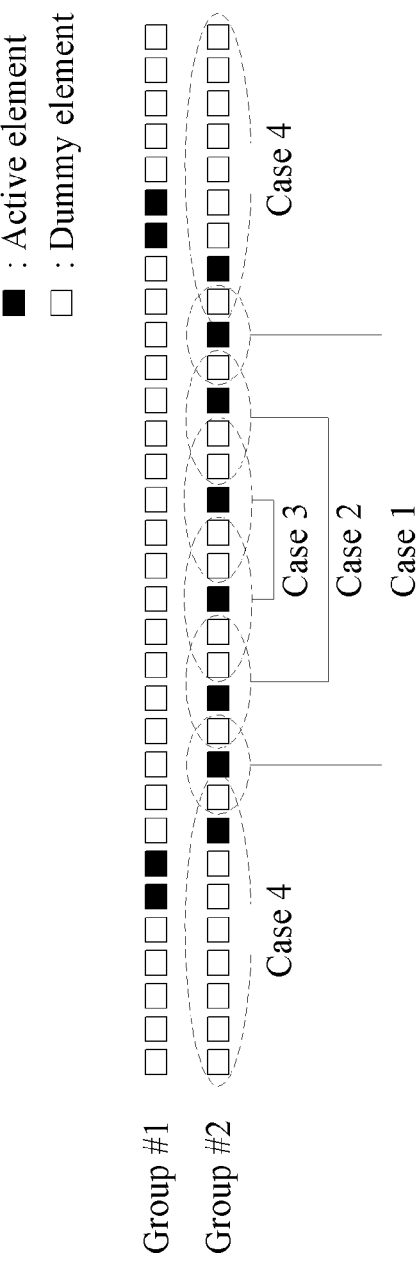
FIG. 8 illustrates examples of configurations of a portion of a MIMO array including elements of a group #1 and elements of a group #2.

FIG. 8 illustrates examples of an arrangement of a portion of a MIMO array including elements of a group #1 and elements of a group #2. In this arrangement of the group #1, Y=8, a=2, b=2, c=2, d=2, and e=0.

FIG. 9 illustrates examples of radiation patterns with respect to elements of a group #1. As shown in FIG. 9, elements of the group #1 may be arranged as in Case 1 to form a radiation pattern with a deep recess at the center. When there are several elements of Case 1 without compensation by elements of Case 3, the degree of recess may overly increase. Thus, it may be preferable that the number of Case 1 is the same as the number of Case 3 (for example, a=c).

Elements of the group #1 arranged as in Case 2, where two dummy elements disposed from one side are compensated by one dummy element disposed from another side, may form a radiation pattern with a flat area at the center.

Elements of the group #1 arranged as in Case 3 may form a radiation pattern with a recess including a convex portion at the center. When there are several elements of Case 3 without compensation by the elements of Case 1, the convex portion at the center of the recess overly increases. Thus, it may be preferable that the number of Case 1 is the same as the number of Case 3.

Elements arranged as in Case 4 and Case 5 may be disposed at an edge or corner of the antenna array. It may be preferable that fewer elements (for example, four or fewer elements) are used in Case 4 and Case 5 than the elements used in Case 1 to Case 3.

An advantageous arrangement of the elements of the group #1 may include an example in which the number of elements of Case 1 is the same as the number of elements of Case 3. In this example, the number of elements of Case 2 may be selected at random.

Figure 10:
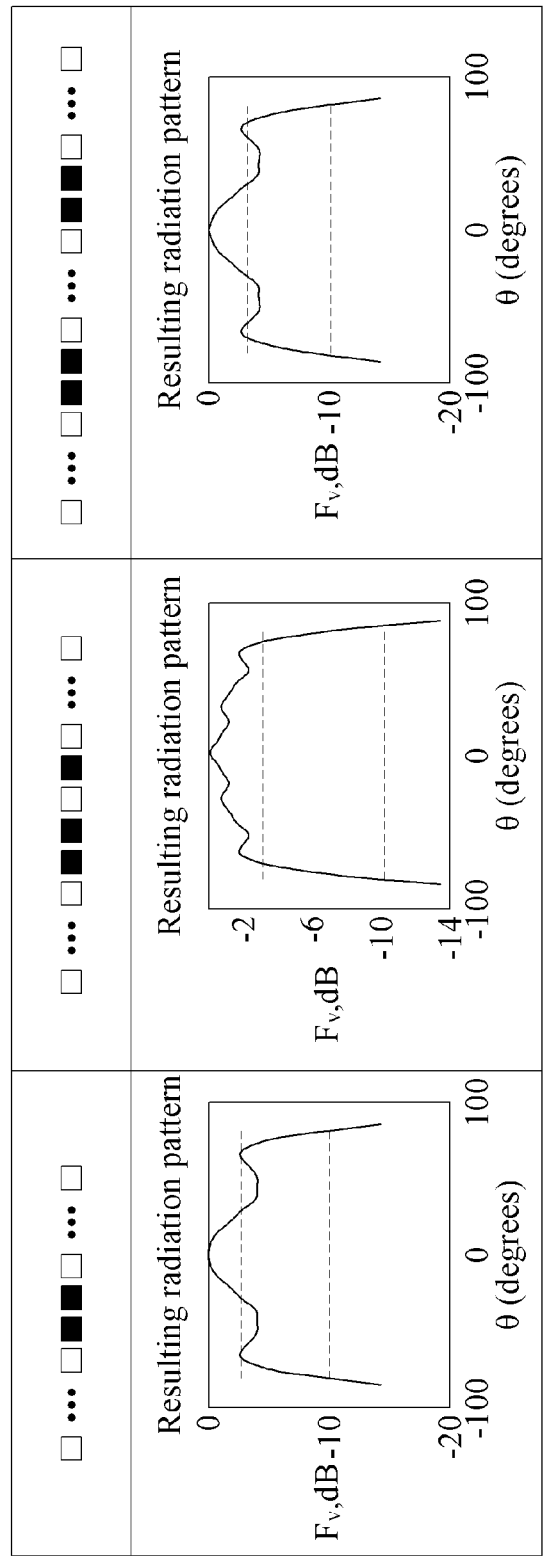
FIG. 10 illustrates examples of radiation patterns with respect to elements of a group #2.

FIG. 10 illustrates examples of radiation patterns with respect to elements of a group #2. As shown in FIG. 10, cases with respect to an arrangement of the elements of the group #2 form radiation patterns with a convex portion at the center.

Figure 11:
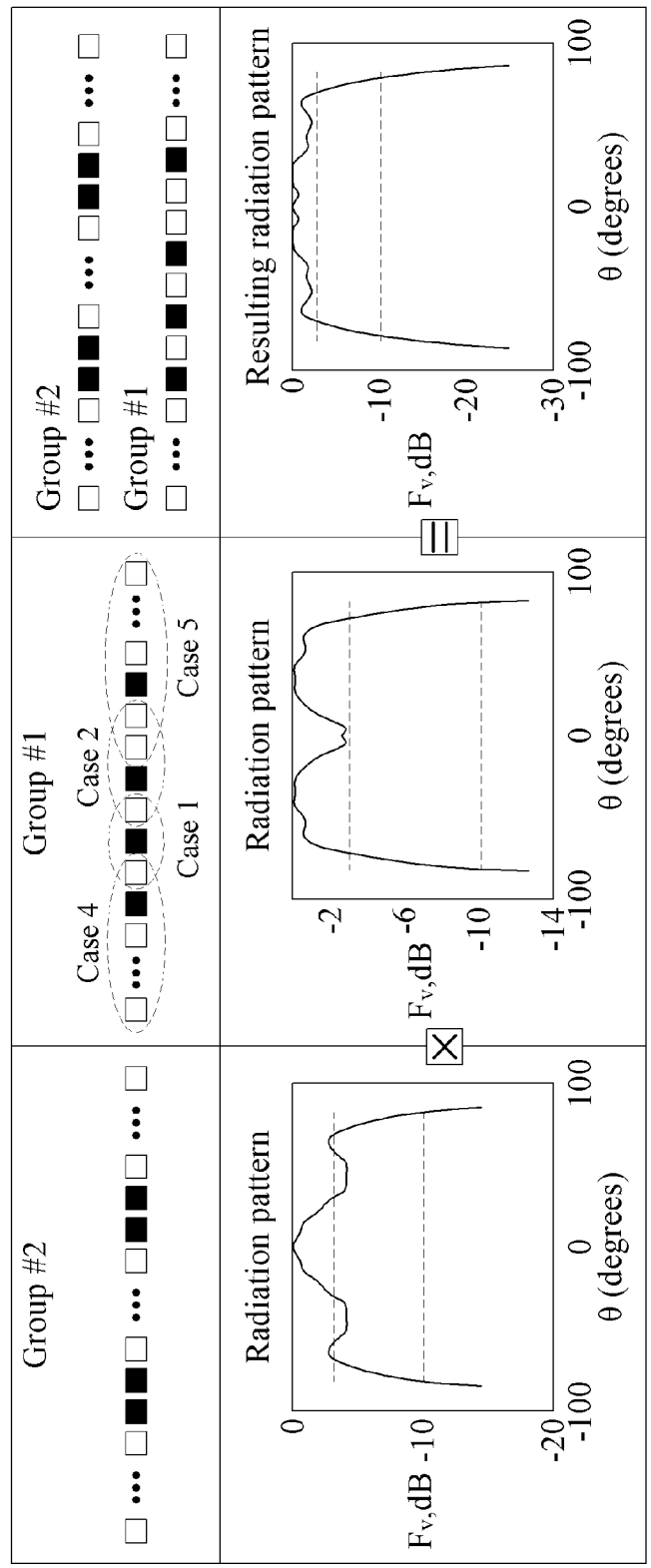
FIG. 11 illustrates examples of forming a resulting radiation pattern of elements of a group #1 and elements of a group #2.

FIG. 11 illustrates examples of forming a resulting radiation pattern of elements of a group #1 and elements of a group #2. As shown in FIG. 11, resulting radiation patterns may be formed from radiation patterns with a recess of the element of the group #1 and radiation patterns with a convex portion of the elements of the group #2. Through this, the resulting radiation pattern may have a wide FoV.

Figure 12:
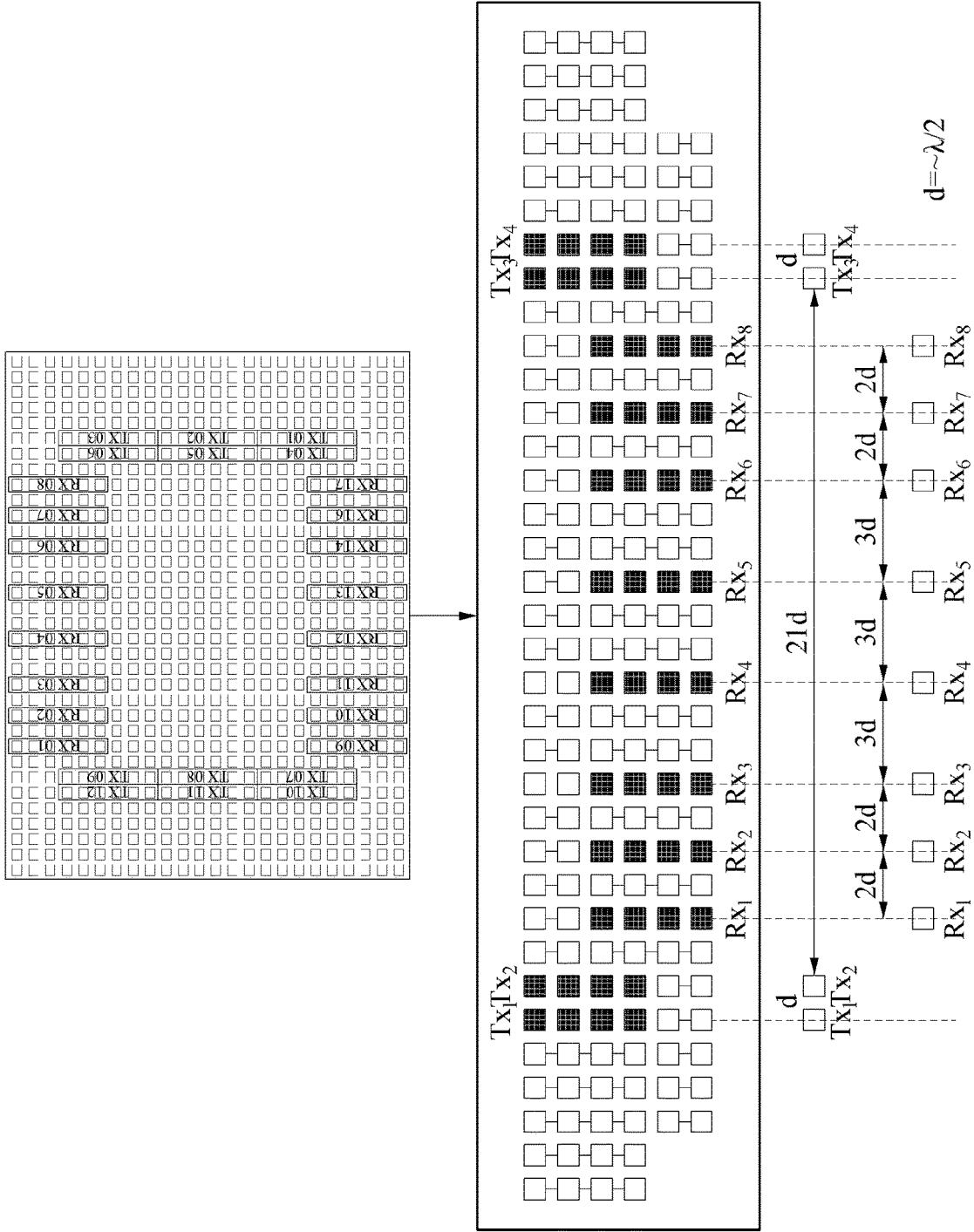
FIG. 12 illustrates an example implementation of a MIMO array (4Tx×8Rx).
Figure 13A:
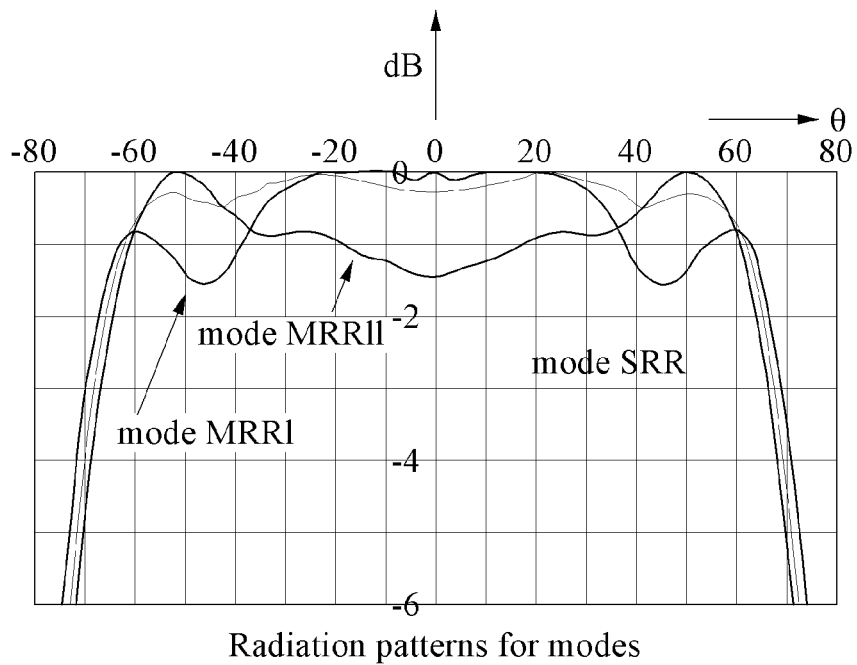
FIGS. 13A and 13B illustrate examples of radiation patterns of a MIMO array in different frequency bands.
Figure 13B:
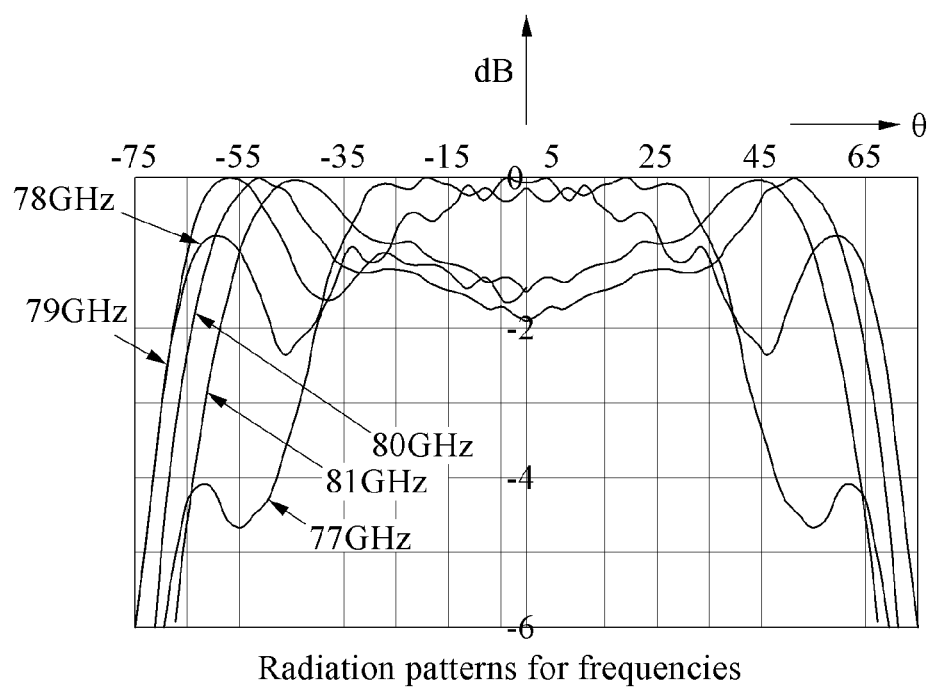

FIG. 12 illustrates an example implementation of a MIMO array (4Tx×8Rx). Referring to FIG. 12, the MIMO array includes active elements ($Tx_i$, $Rx_j$) and dummy elements. i denotes an index of a transmitting element, and j denotes an index of a receiving element. Neighboring elements may be disposed to be spaced apart by a distance d. In an example of FIG. 12, two rows of the MIMO array may include both transmitting and receiving elements. FIGS. 13A and 13B illustrate examples of radiation patterns of a MIMO array in different frequency bands. The examples may be used in various wide frequency bands. Referring to FIG. 13, when used for an automotive radar system in SRR (77-81 GHz), MRR I (77-79 GHz), and MRR II (79-81 GHz) modes, the MIMO array of the examples may have an FoV increased to about 140 degrees.

Figure 14:
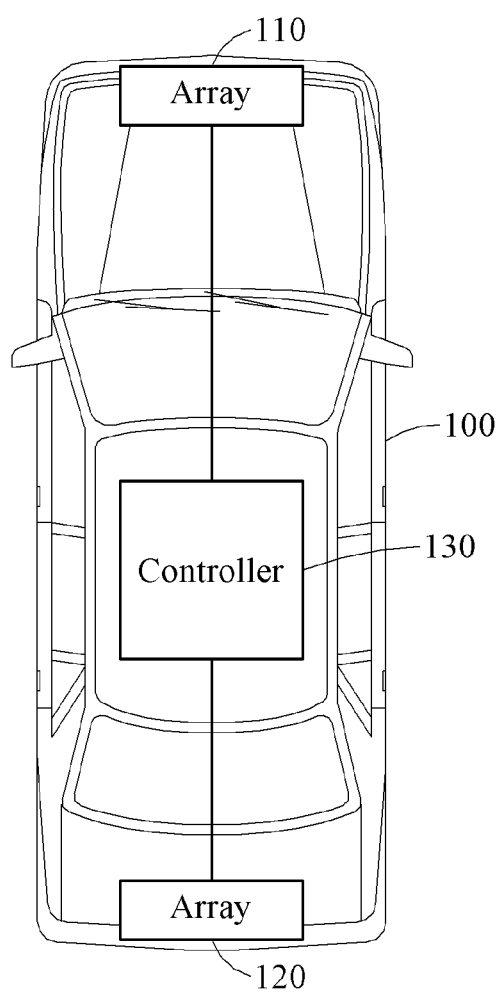
FIG. 14 illustrates an example of an antenna array apparatus.

FIG. 14 illustrates an example of an antenna array apparatus. In an example, an antenna array apparatus 100 may be a vehicle including an antenna array 110, an antenna array 120, and a controller 130. Each of the antenna arrays may be representative of any of the antenna arrays discussed above with respect to FIGS. 1-13, which may also be referred to as antenna array apparatuses, or, in combination with a controller, representative of such antenna array apparatuses. The antenna array 110 may be mounted on a front bumper of the vehicle and the antenna array 120 may be mounted on a rear bumper of the vehicle. The antenna array 110 may be configured to detect an environment as well as one or more objects in front of the vehicle, and the antenna array 120 may be configured to detect an environment as well as one or more objects behind the vehicle. Each of antenna arrays 110 and 120 may be representative of a plurality of antenna arrays. The controller 130 may be representative of one or more processors and may be configured to control the antenna arrays 110 and 120, and to process signals received from the antenna arrays 110 and 120. In addition, the antenna array apparatus 100 is not limited to detecting the forward and rearward directions.

Examples may be implemented in a framework of standard PCB technology. According to examples, a wide-FoV MIMO antenna array may not require additional elements (lenses) to extend the FoV, may not complexify the structure when compared to an existing PCB, and may be implemented on the top layer of the PCB. Thus, the examples may advantageously provide a simple, compact, and cheap MIMO array with a wide FoV and high resolution.

According to examples, a MIMO array may be applied to a radar system for navigation of an automotive including an autonomous vehicle. A single MIMO array with an FoV of about 140 degrees may replace a typical antenna system wherein two antenna arrays each with an FoV of about 90 degrees are used, wherein the typical antenna system has been used for a vehicle to detect an object in front (or in rear) of the vehicle. Thus, by reducing the total number of radars of the vehicle, compared to the typical antenna system, the power consumption may be advantageously reduced and the installation and tuning process may be advantageously simplified in the antenna array of the present application.

The examples may be used for Internet of things (IoT) and a wireless communication system of evolved 5G and Wi-Gig standard. In this example, the examples may be used for all antennas of a base station and a mobile terminal. In this example, the examples may be used to design an ultra-wide FoV base station. When used for robotics, an antenna array of the examples may be used to detect and/or avoid an obstacle.

Further, the examples may be applied to all types (for example, outdoor/indoor, automotive, and mobile) of wireless power transmission systems such as long-distance wireless power transfer (LWPT). In addition, a high power transmission efficiency may be achieved in all scenarios.

The MIMO antenna arrays, antenna arrays, transmitting antennas, receiving antennas, radar systems, antenna array apparatuses, first antennas, second antennas, element groups, elements, radiating antenna elements, dummy antenna elements, active elements, in-phase elements, anti-phase elements, receiving elements, transmitting elements, and other apparatuses, units, modules, devices, and other components described herein with respect to FIGS. 1-13B are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna array apparatus, comprising:
   plural active elements configured to radiate an electromagnetic wave or receive a reflected electromagnetic wave; and
   plural dummy elements being disposed on either one or both sides of the active elements,
   wherein a first dummy element, closest to an active element of the plural active elements, of the plural dummy elements is configured to suppress the electromagnetic wave radiated from the active element,
   wherein a second dummy element, next closest to the active element after the first dummy element, of the plural dummy elements, is configured to amplify the electromagnetic wave,
   wherein a first active element, of the plural active elements, is configured to be a receiving element in response to a second active element, of the plural active elements, being configured to be a transmitting element,
   wherein first antenna elements comprising the first active element, of the plural active elements and the plural dummy elements, are arranged to form a first radiation pattern with a recessed portion at the center of the first radiation pattern, and second antenna elements comprising the second active element, of the plural active elements and the plural dummy elements, are arranged to form a second radiation pattern with a convex portion at the center of the second radiation pattern, and
   wherein the first antenna elements are configured to correspond to receiving elements in response to the second antenna elements being configured to correspond to transmitting elements.

2. The antenna array apparatus of claim 1, wherein
   $\lambda$ is a length of the electromagnetic wave, and
   a distance between phase centers of directly adjacent elements, among elements including the active element and the plural dummy elements, is $\lambda/2$.

3. The antenna array apparatus of claim 1, wherein
   the plural dummy elements include one or more antiphase dummy elements or one or more in-phase dummy elements,
   wherein the one or more antiphase dummy elements are configured to suppress the electromagnetic wave radiated from the active element by reflecting a portion of energy of the electromagnetic wave, and
   the one or more in-phase dummy elements are configured to amplify the electromagnetic wave by reflecting another portion of the energy of the electromagnetic wave.

4. The antenna array apparatus of claim 3, wherein
   the first dummy element closest to the active element, among the plural dummy elements, corresponds to one of the one or more antiphase dummy elements, and
   the second dummy element next closest to the active element after the first dummy element, among the plural dummy elements, corresponds to one of the one or more in-phase dummy elements.

5. The antenna array apparatus of claim 1, wherein a maximum radiation pattern of the active element is suppressed by reflecting, by the plural dummy elements, a portion of energy of the electromagnetic wave radiated from the active element, and a field of view (FoV) of the antenna array apparatus is increased by reflecting, by the plural dummy elements, another portion of the energy of the electromagnetic wave.

6. The antenna array apparatus of claim 1, wherein the active element corresponds to either one or both of a transmitting element and a receiving element.

7. A wireless communication apparatus, comprising:
an antenna array comprising:
plural active elements configured to radiate an electromagnetic wave or receive a reflected electromagnetic wave; and
plural dummy elements being disposed on either one or both sides of the active elements,
wherein a first dummy element, closest to an active element of the plural active elements, of the plural dummy elements is configured to suppress the electromagnetic wave radiated from the active element,
wherein a second dummy element, next closest to the active element after the first dummy element, of the plural dummy elements, is configured to amplify the electromagnetic wave,
wherein a first active element, of the plural active elements, is configured to be a receiving element in response to a second active element, of the plural active elements, being configured to be a transmitting element,
wherein first antenna elements comprising the first active element, of the plural active elements and the plural dummy elements, are arranged to form a first radiation pattern with a recessed portion at the center of the first radiation pattern, and second antenna elements comprising the second active element, of the plural active elements and the plural dummy elements, are arranged to form a second radiation pattern with a convex portion at the center of the second radiation pattern, and
wherein the first antenna elements are configured to correspond to receiving elements in response to the second antenna elements being configured to correspond to transmitting elements.

8. The wireless communication apparatus of claim 7, wherein one or more antiphase dummy elements are configured to suppress the electromagnetic wave radiated from the active element by reflecting a portion of energy of the electromagnetic wave, and
one or more in-phase dummy elements are configured to amplify the electromagnetic wave by reflecting another portion of the energy of the electromagnetic wave.

9. The wireless communication apparatus of claim 7, wherein
the first dummy element closest to the active element, among the plural dummy elements, corresponds to one of the one or more antiphase dummy elements, and
the second dummy element next closest to the active element after the first dummy element, among the plural dummy elements, corresponds to one of the one or more in-phase dummy elements.

10. The wireless communication apparatus of claim 7, wherein a maximum radiation pattern of the active element is suppressed by reflecting, by the plural dummy elements, a portion of energy of the electromagnetic wave radiated from the active element, and a field of view (FoV) of the antenna array is increased by reflecting, by the plural dummy elements, another portion of the energy of the electromagnetic wave.

11. The wireless communication apparatus of claim 7, wherein the active element corresponds to either one or both of a transmitting element and a receiving element.

12. A wireless power transmission apparatus, comprising:
an antenna array comprising:
plural active elements configured to radiate an electromagnetic wave or receive a reflected electromagnetic wave; and
plural dummy elements being disposed on either one or both sides of the active elements,
wherein a first dummy element, closest to an active element of the plural active elements, of the plural dummy elements is configured to suppress the electromagnetic wave radiated from the active element, and a second dummy element, next closest to the active element after the first dummy element, of the plural dummy elements, is configured to amplify the electromagnetic wave,
wherein the active elements include either one or both of a transmitting element and a receiving element,
wherein a first active element, of the plural active elements, is configured to be a receiving element in response to a second active element, of the plural active elements, being configured to be a transmitting element,
wherein first antenna elements comprising the first active element, of the plural active elements and the plural dummy elements, are arranged to form a first radiation pattern with a recessed portion at the center of the first radiation pattern, and second antenna elements comprising the second active element, of the plural active elements and the plural dummy elements, are arranged to form a second radiation pattern with a convex portion at the center of the second radiation pattern, and
wherein the first antenna elements are configured to correspond to receiving elements in response to the second antenna elements being configured to correspond to transmitting elements.

13. The wireless power transmission apparatus of claim 12, wherein
$\lambda$ is a length of the electromagnetic wave, and
a distance between phase centers of directly adjacent elements, among elements including the active element and the plural dummy elements, is $\lambda/2$.

14. The wireless power transmission apparatus of claim 12,
wherein one or more antiphase dummy elements are configured to suppress the electromagnetic wave radiated from the active element by reflecting a portion of energy of the electromagnetic wave, and
one or more in-phase dummy elements are configured to amplify the electromagnetic wave by reflecting another portion of the energy of the electromagnetic wave.

15. The wireless power transmission apparatus of claim 14, wherein
the first dummy element closest to the active element, among the plural dummy elements, corresponds to one of the one or more antiphase dummy elements, and
the second dummy element next closest to the active element after the first dummy element, among the plural dummy elements, corresponds to one of the one or more in-phase dummy elements.

16. The wireless power transmission apparatus of claim 12, wherein a maximum radiation pattern of the active element is suppressed by reflecting, by the plural dummy elements, a portion of energy of the electromagnetic wave radiated from the active element, and a field of view (FoV) of the antenna array is increased by reflecting, by the plural dummy elements, another portion of the energy of the electromagnetic wave.

17. The wireless communication apparatus of claim 7, wherein
- λ is a length of the electromagnetic wave, and
- a distance between phase centers of directly adjacent elements, among elements including the active element and the plural dummy elements, is λ/2.

* * * * *